(12) United States Patent
Josiam et al.

(10) Patent No.: US 8,358,608 B2
(45) Date of Patent: Jan. 22, 2013

(54) METHOD AND APPARATUS FOR HARQ OPERATION WITH NETWORK CODING

(75) Inventors: Kaushik Josiam, Dallas, TX (US);
Zhouyue Pi, Richardson, TX (US);
Farooq Khan, Allen, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 723 days.

(21) Appl. No.: 12/386,774

(22) Filed: Apr. 22, 2009

(65) Prior Publication Data
US 2010/0124186 A1    May 20, 2010

Related U.S. Application Data

(60) Provisional application No. 61/199,338, filed on Nov. 14, 2008.

(51) Int. Cl.
*H04B 7/14* (2006.01)
(52) U.S. Cl. .......................... 370/315; 370/476
(58) Field of Classification Search .......... 370/315, 370/328, 338, 343, 345, 401, 474, 476
See application file for complete search history.

(56) References Cited

U.S. PATENT DOCUMENTS

| | | | |
|---|---|---|---|
| 5,596,439 A * | 1/1997 | Dankberg et al. | 398/35 |
| 6,216,107 B1 * | 4/2001 | Rydbeck et al. | 704/500 |
| 7,609,697 B2 * | 10/2009 | Nishida et al. | 370/394 |
| 7,920,501 B2 * | 4/2011 | Larsson et al. | 370/315 |
| 2004/0005861 A1 * | 1/2004 | Tauchi | 455/11.1 |
| 2005/0059342 A1 * | 3/2005 | Engels et al. | 455/7 |
| 2007/0265015 A1 * | 11/2007 | Lagerman | 455/452.1 |
| 2007/0280188 A1 | 12/2007 | Kang et al. | |
| 2008/0219229 A1 | 9/2008 | Zheng | |
| 2009/0010198 A1 * | 1/2009 | Boariu et al. | 370/315 |
| 2009/0041097 A1 * | 2/2009 | Lee et al. | 375/211 |
| 2009/0073914 A1 * | 3/2009 | Sun et al. | 370/315 |
| 2010/0088568 A1 * | 4/2010 | Larsson | 714/751 |

FOREIGN PATENT DOCUMENTS

KR     100787969 B1     12/2007

OTHER PUBLICATIONS

International Search Report dated May 25, 2010 in connection with International Patent Application No. PCT/KR2009/006695.
Written Opinion of the International Searching Authority dated May 25, 2010 in connection with International Patent Application No. PCT/KR2009/006695.

* cited by examiner

*Primary Examiner* — Ricky Ngo
*Assistant Examiner* — Christine Ng

(57) ABSTRACT

For use in a wireless communication network, methods for encoding information bit streams at a relay station are provided. Each method includes receiving data packets from a base station and a mobile station. Each method also includes decoding the packets and re-encoding the packets. Each method further includes combining the re-encoded packets into another packet using an XOR operation, and transmitting the other packet to the base station and the mobile station.

20 Claims, 8 Drawing Sheets

METHOD AND APPARATUS FOR HARQ OPERATION WITH NETWORK CODING

CROSS-REFERENCE TO RELATED APPLICATION(S) AND CLAIM OF PRIORITY

The present application is related to U.S. Provisional Patent No. 61/199,338, filed Nov. 14, 2008 entitled "METHOD AND APPARATUS FOR HARQ OPERATING WITH NETWORK". Provisional Patent No. 61/199,338 is assigned to the assignee of the present application and is hereby incorporated by reference into the present application as if fully set forth herein. The present application hereby claims priority under 35 U.S.C. §119(e) to U.S. Provisional Patent No. 61/199,338.

TECHNICAL FIELD OF THE INVENTION

The present application relates generally to wireless communications networks and, more specifically, to a method and apparatus for HARQ operation with network coding.

BACKGROUND OF THE INVENTION

A typical cellular radio system consists of a collection of fixed base stations (BS) that define the radio coverage areas or cells. Typically, a non-line-of-sight (NLOS) radio propagation path exists between a base station and a mobile station due to natural and man-made objects that are situated between the base station and the mobile station. As a consequence, the radio waves propagate via reflections, diffractions and scattering. However, even with non-line-of-sight propagation, there exist scenarios where the mobile station cannot receive the signal with enough viability to maintain connection to the base station. For example, the mobile station could be outside the coverage area of the base station, or in a dead spot like the basement of a building. In such scenarios, relay stations are inserted to augment transmission capabilities of the transmitter, in order that the mobile station may receive the data meant for it.

SUMMARY OF THE INVENTION

A method for encoding information bit streams at a relay station is provided. The method includes receiving a first packet from a base station. The method also includes receiving a second packet from a mobile station. The method also includes decoding the first and second packets. The method further includes re-encoding the first and second packets. The method further includes combining the re-encoded first and second packets into a third packet using an XOR operation. The method also includes transmitting the third packet to the base station and the mobile station.

A wireless communications network comprising a plurality of relay stations is provided. Each relay station is configured to receive a first packet from a base station. Each relay station is also configured to receive a second packet from a mobile station. Each relay station is further configured to decode the first and second packets. Each relay station is also configured to re-encode the first and second packets. Each relay station is further configured to combine the re-encoded first and second packets into a third packet using an XOR operation. Each relay station is also configured to transmit the third packet to the base station and the mobile station.

A mobile station capable of accessing a wireless communication network comprising a plurality of relay stations is provided. The mobile station is configured to send a first packet to one of the plurality of relay stations. The mobile station is also configured to receive from the one relay station a second packet, the second packet comprising a coded combination of the first packet and a third packet. The mobile station is further configured to decode the second packet. The mobile station is also configured to send an acknowledgement to the one relay station, the acknowledgement indicating if the second packet was successfully decoded.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 14B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications network.

The following are referenced below and are incorporated herein by reference: R. Ahlswede, N. Cai, S.-Y. R Li, and R. W. Yeung, "Network Information Flow." *IEEE Transactions on Information Theory* 46, no. 4 (July 2000): 1204-1216 (hereafter "Ahlswede"); Dina Katabi, Rahul Hariharan, Sachin Katti, "Methods and apparatus for network coding", US patent application US—2008/0075080 A1 2008 (hereafter "Katabi"); Li, S.-Y. R, R. W. Yeung, and N. Cai, "Linear Network Coding." *IEEE Transactions on Information Theory* 49, no. 2 (February 2003): 371-381 (hereafter "Li"); and Katti, Sachin, H. Rahul, W. Hu, D. Katabi, M. Medard, and J. Crowcroft, "XORs in the Air: Practical Wireless Network Coding." *Proceedings of ACM SIGCOMM* 2006, September 2006 (hereafter "Katti").

Figure 1:
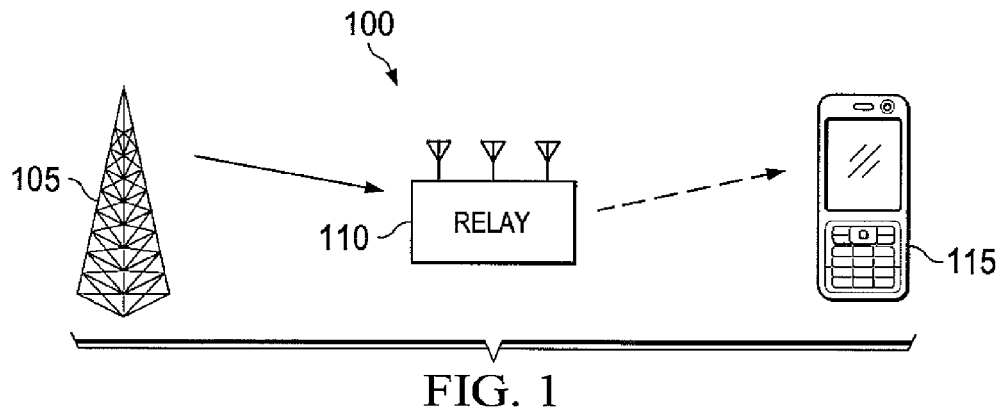
FIG. 1 illustrates a simple two hop relay in a wireless network incorporating a relay station, according to one embodiment of the present disclosure.

FIG. 1 illustrates a simple two hop relay in a wireless network incorporating a relay station, according to one embodiment of the present disclosure. Wireless network 100 includes base station 105, relay station 110, and mobile station 115. Although only one base station, relay station and mobile station are depicted, it is understood that wireless network 100 could include additional base stations, relay stations, and/or mobile stations. In wireless network 100, relay station 110 is employed to improve communication between base station 105 and mobile station 115. Data from base station 105 is first transmitted to relay station 110. Then relay station 110 transmits the data to mobile station 115. Before discussing relaying in depth, it may be advantageous to set up the basic framework for the access system in cellular networks.

Figure 2:
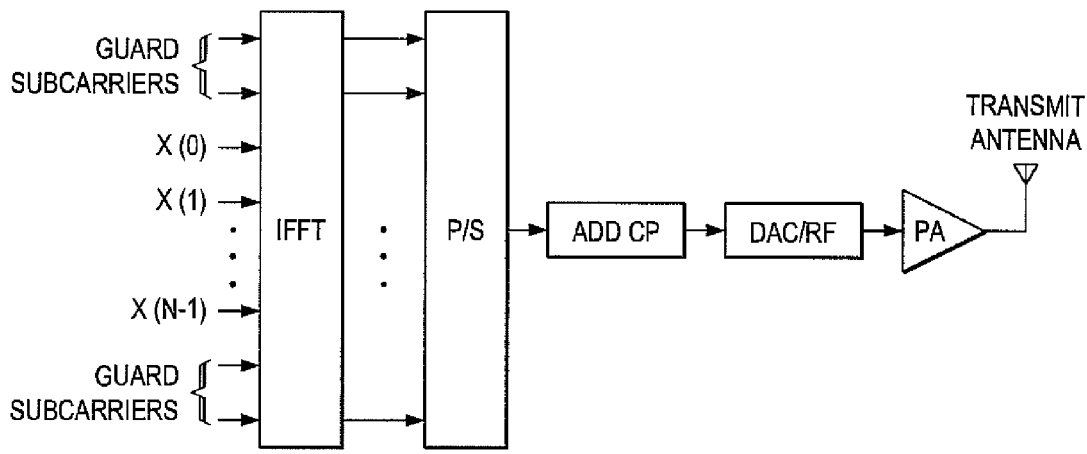
FIG. 2 illustrates a digital implementation of a baseband OFDM transmitter, according to one embodiment of the present disclosure.
Figure 3:
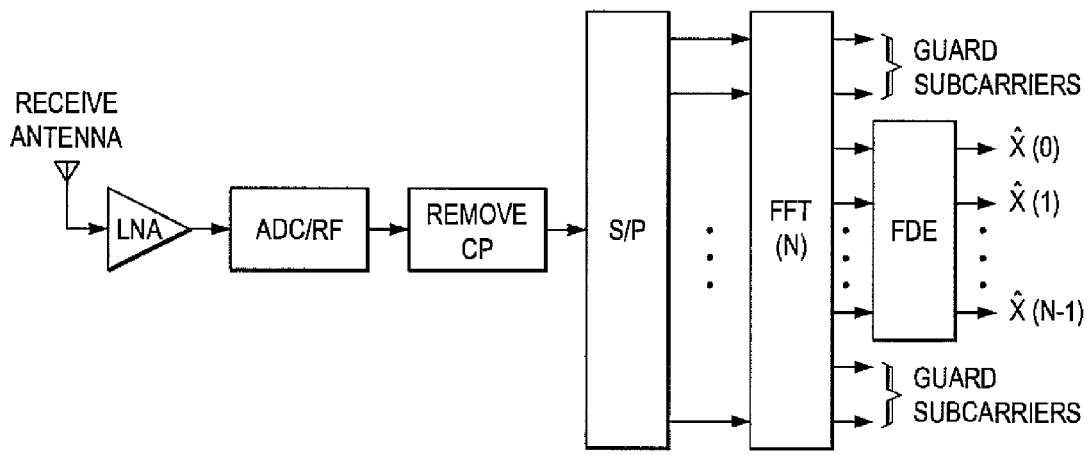
FIG. 3 illustrates a digital implementation of a baseband OFDM receiver, according to one embodiment of the present disclosure.

Orthogonal Frequency Division Multiplexing (OFDM) is a multi-carrier modulation method. It is the preferred access technique in modern wireless communication systems due to its robustness to multipath fading and simpler implementation. OFDM is considered multi-carrier because the available bandwidth is split into many small bands called subcarriers. The number of OFDM subcarriers in an OFDM system is generally selected as power of 2, which allows the use of more efficient FFT (Fast Fourier Transform) and IFFT (Inverse FFT) algorithms. The complex modulation symbols are mapped to the input of IFFT at the transmitter. No information is transmitted on the guard subcarriers. A cyclic prefix is added after IFFT operation and the resulting sequence is up-converted to RF, then amplified and transmitted as shown in FIG. 2. On the receiver side, the received signal is filtered, amplified and down-converted from RF as shown in FIG. 3. The cyclic prefix samples are discarded and an FFT operation is performed on the received samples sequence. Frequency domain equalization (FDE) is performed using channel estimates obtained from received pilots or reference signals, and the estimates of the transmitted complex modulation symbols are obtained.

Figure 4:
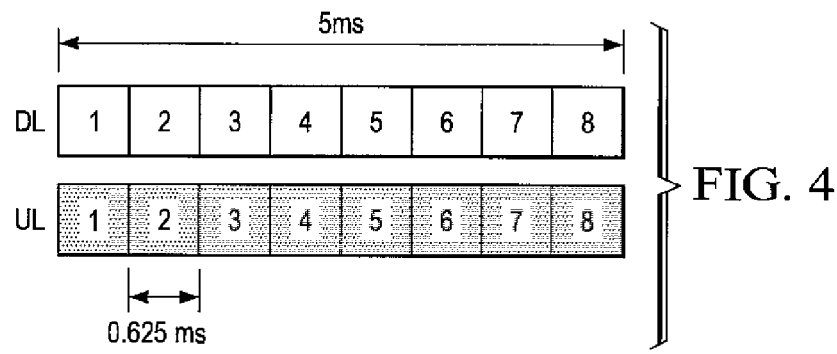
FIG. 4 illustrates an example of a frequency division duplex (FDD) system, according to one embodiment of the present disclosure.

When the subcarriers are allocated to different users in a multiuser scenario such as a cellular system, the system is called an Orthogonal Frequency Division Multiple Access (OFDMA) system. In an OFDMA system, the base station communicates with many mobile stations. The communication from the base station to a mobile station is called downlink (DL), while the communication from mobile station to base station is called uplink (UL). Each mobile station is allocated a set of subcarriers based on a complex scheduling algorithm that takes into account the demand from the mobile station, the overall demand from all other mobile stations, fairness and the quality of service constraints. The subcarrier allocation can change dynamically over time. Downlink and uplink communications are separated in either the frequency domain or time domain. If downlink and uplink separation is enforced in the frequency domain, then the system is a frequency division duplex (FDD) system. FIG. 4 illustrates an example of an FDD system. In an FDD system, the downlink and uplink transmissions happen simultaneously on different frequency bands. The transmission in time is divided into timeslots referred to as sub-frames.

Figure 5:
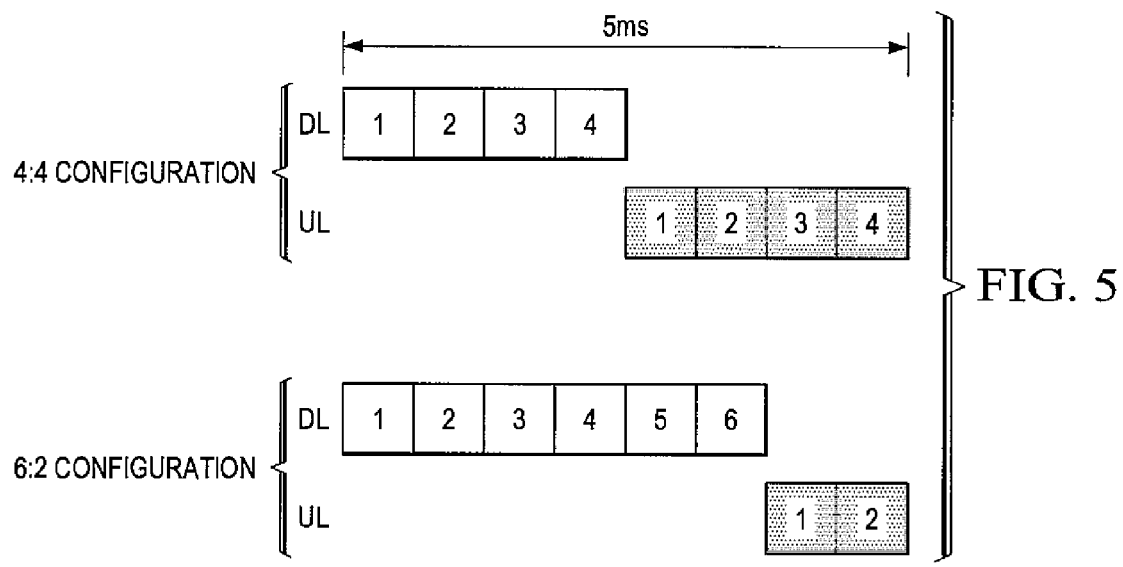
FIG. 5 illustrates an example of a time division duplex (TDD) system, according to one embodiment of the present disclosure.

FIG. 5 illustrates an example of a time division duplex (TDD) system. A TDD system is a system where uplink and downlink transmissions are separated in time. In a TDD system, a single frequency band is used for uplink and downlink transmission. The transmission time can be shared between downlink and uplink in different proportions such as a 4:4 configuration (4 sub-frames downlink and 4 sub-frames in the uplink) or a 6:2 configuration (6 sub-frames downlink and 2 sub-frames in the uplink). An advantage of TDD systems is that the uplink and downlink channels are symmetric, which allows for downlink channel quality and channel estimation at the base station from uplink transmissions. In a FDD system, the mobile station calculates channel quality and information from downlink pilot transmissions and feeds the information back to the base station on a feedback channel.

The base station, relay station and mobile station communicate using a pre-agreed access scheme. For example, in IEEE 802.16m, the base station, relay station and mobile station communicate using OFDM as their preferred radio access scheme. The downlink/uplink implementation is left to the operator and can be either TDD or FDD.

In communications where relay stations are involved, relay stations are seen as data forwarding devices. Specifically, they detect data from the transmitter and process it for transmission to receiver. The transmitter is the base station on the downlink and mobile station/relay station on the uplink. Most processing functions at the relay station take one of the following three forms: i) amplify and forward, ii) decode and forward, and iii) compress and forward. In processing the data from the transmitter, relay stations generate no data of their own to the receiver, but only strive to faithfully replicate the signal from the transmitter and forward it to the receiver. As an alternative to viewing relay stations as mere data forwarding devices, recent studies have shown that intelligent coding at relay stations can improve overall system throughput. This coding approach to relaying is termed network coding.

Figure 6:
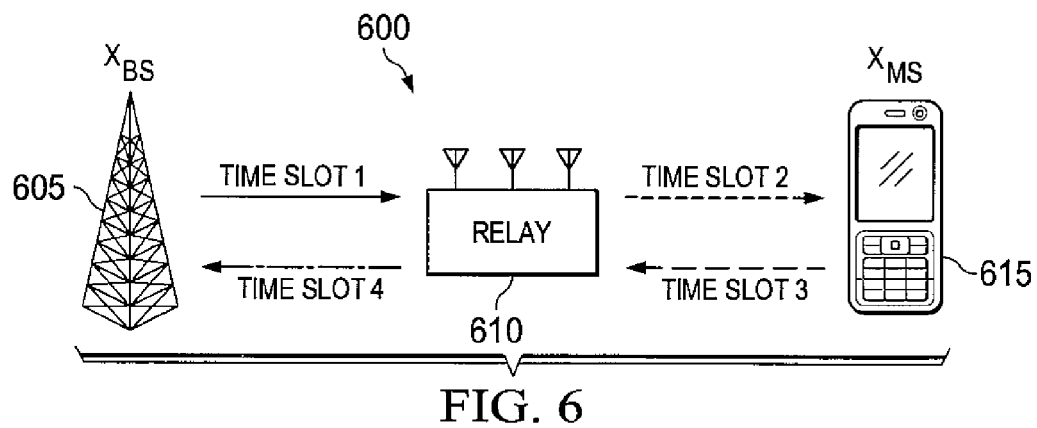
FIG. 6 illustrates a relay operation in a TDD system without the benefit of network coding, according to one embodiment of the present disclosure.

FIG. 6 illustrates a relay operation in a TDD system without the benefit of network coding, according to one embodiment of the present disclosure. In wireless network 600, base station 605 and mobile station 615 want to exchange a couple of data packets. Since mobile station 615 is not in the coverage area of base station 605, it has to communicate through relay station 610. In a time domain duplex (TDD) implementation such as shown in FIG. 6, base station 605 transmits the packet $x_{BS}$ to relay station 610 in time slot 1. Then relay station 610 forwards the packet to mobile station 615 in time slot 2. Similarly, mobile station 615 transmits its packet, $x_{MS}$, to relay station 610 in time slot 3, which is then transmitted to base station 605 in time slot 4. Therefore a total of four time slots are used to exchange packets between base station 605 and mobile station 615.

Figure 7:
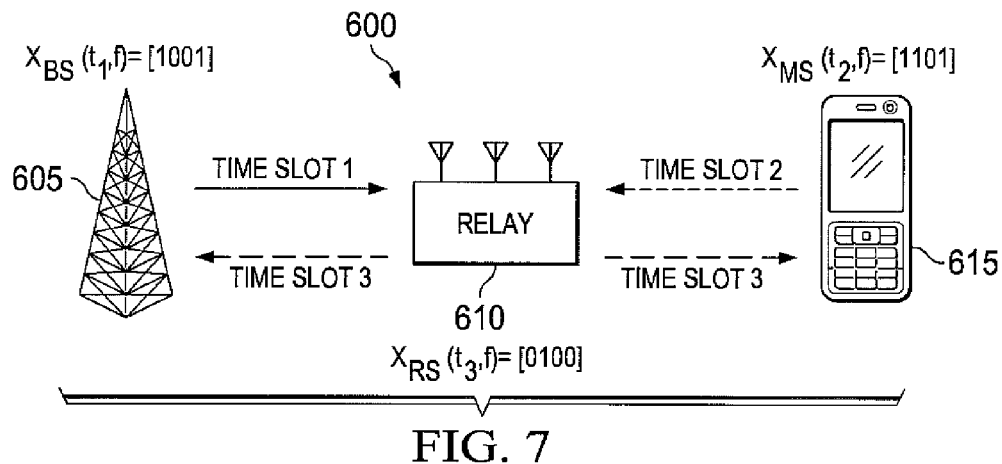
FIG. 7 illustrates a similar relay operation in a TDD system using network coding, according to one embodiment of the present disclosure.

FIG. 7 illustrates a similar relay operation in a TDD system using network coding to save resources, according to one embodiment of the present disclosure. Relay station 610, after receiving the packets from base station 605 and mobile station 615 in time slots 1 and 2, XORs the two packets and broadcasts them to both base station 605 and mobile station 615 in time slot 3. Base station 605 recovers the message from mobile station 615 by XORing again with its own packet, and mobile station 615 recovers base station 605's message in the same way. Thus, coding at relay station 610 saves a time slot which consequently results in improving system throughput. Similar improvements can be in an FDD system by using network coding at the relay station. Such a coding at the relay station was first proposed in the Ahlswede reference.

The examples discussed above illustrate network coding at the bit level. More sophisticated bit level Galois field GF(2n) coding operations meant for the relay station are reported in the Ahlswede, Katabi, Li, and Katti references. A practical implementation of network coding that reported enormous throughput benefits is discussed in the Katti reference. The network coding architecture requires that the information bits be combined.

Before baseband modulation is applied, the bit stream is processed for error protection using a combination of error detection and error correction codes. Modern communication equipment works with both error correction and error detection capabilities. For error correction, a rate punctured convolution turbo code is used on the data channel. The error detection capabilities are provided by the CRC mask that is applied to the convolution coded sequence. The combination of both error correction and detection enables Hybrid ARQ operation at the receiver.

Figure 8:
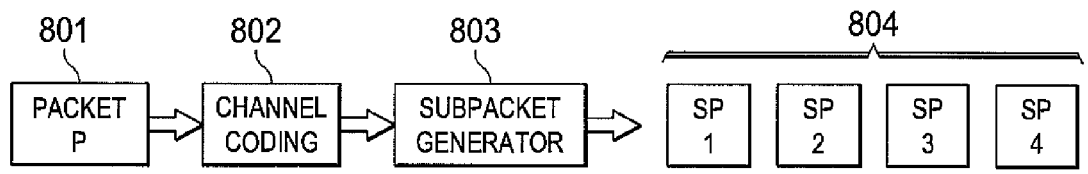
FIG. 8 illustrates an exemplary generation of subpackets in Hybrid ARQ, according to one embodiment of the present disclosure.

FIG. 8 illustrates an exemplary generation of subpackets in Hybrid ARQ, according to one embodiment of the present disclosure. Hybrid ARQ is a retransmission scheme whereby the transmitter sends redundant coded information. In one aspect of operation, the generation of subpackets starts with a standard information packet 801. Channel coding is performed at 802 on information packet 801 to create a coded bit stream. Next, subpacket generator 803 breaks the resulting coded bit stream into smaller subpackets 804.

Figure 9:
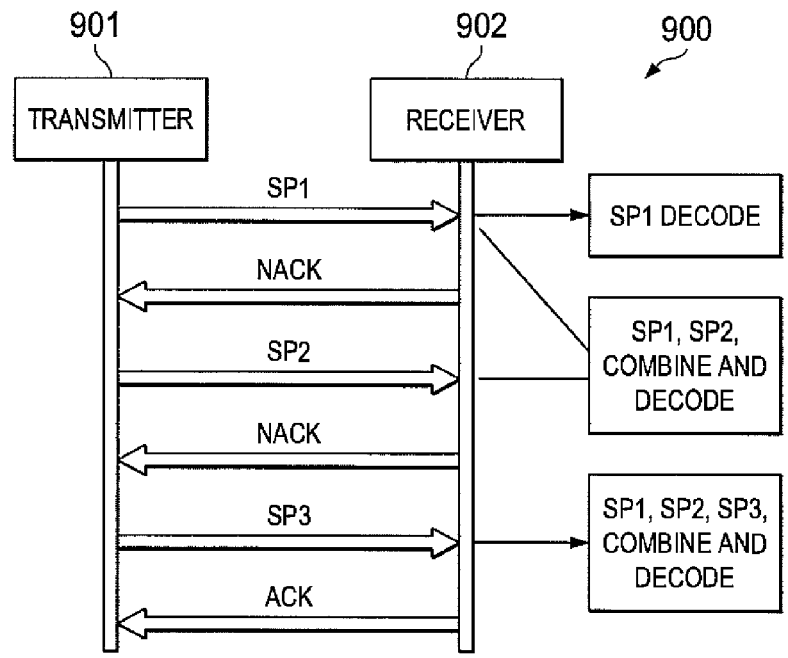
FIG. 9 illustrates an example of Hybrid ARQ protocol in a wireless communication system, according to one embodiment of the present disclosure.

FIG. 9 illustrates an example of Hybrid ARQ protocol in a wireless communication system, according to one embodiment of the present disclosure. Wireless communication system 900 includes a transmitter 901 and a receiver 902. In one aspect of operation, receiver 902 tries to decode the information after receiving the first subpacket SP1. In the case of unsuccessful decoding, receiver 902 stores subpacket SP1 and sends a NACK signal to transmitter 901. After receiving the NACK signal, transmitter 901 performs transmission of the second subpacket SP2. After receiving subpacket SP2, receiver 902 combines SP2 with the previously stored subpacket SP1 and tries to jointly decode the information packet P. At any point, if the information packet is successfully decoded by indication of a successful CRC (Cyclic Redundancy Check) check, for example, then receiver 902 sends an ACK signal to transmitter 901. In the example of FIG. 9, the information packet is successfully decoded after receiving and combining three subpackets, SP1, SP2 and SP3. The ARQ protocol shown in FIG. 9 is generally referred to as stop-and-wait protocol because the transmitter waits for the ACK/NACK signal before sending the next subpacket. After receiving the ACK signal, transmitter 901 can move on to the transmission of a new information packet to the same or a different user.

Figure 10:
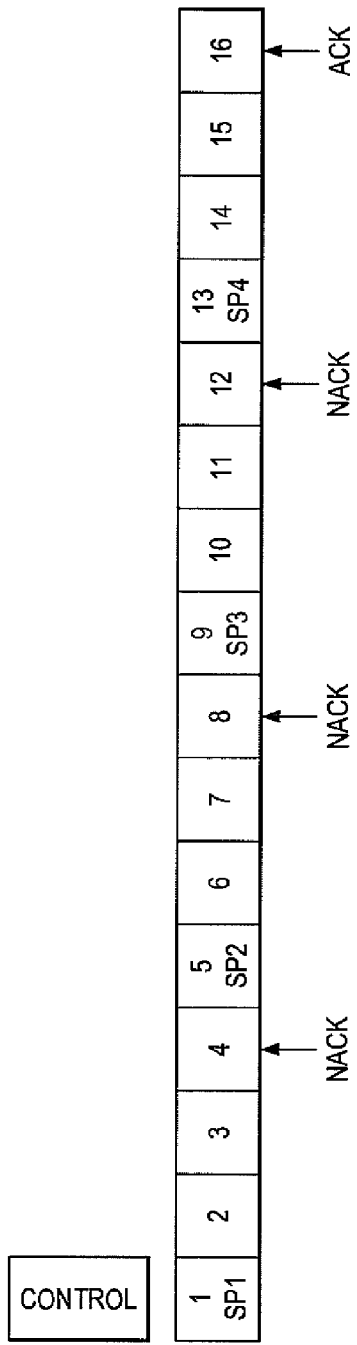
FIG. 10 shows an example of N-channel stop-and-wait synchronous Hybrid ARQ protocol, according to one embodiment of the present disclosure.

FIG. 10 shows an example of N-channel stop-and-wait (SAW) synchronous Hybrid ARQ (HARQ) protocol, according to one embodiment of the present disclosure. In the example of FIG. 10, N is assumed equal to 4. In a system using synchronous HARQ protocol, the retransmissions happen at fixed time intervals. With N=4, if the first subpacket is transmitted in time slot 1, the retransmissions can only happen in slots 5, 9 and 13. In case of N-channel stop-and-wait (SAW), N parallel information packets can be transmitted on each of the N SAW channels. One of the benefits of synchronous HARQ is that the control information only needs to be transmitted along with the first subpacket transmission because the timing of the retransmissions is predetermined. However, the predetermined timing of the retransmissions is also a drawback of synchronous HARQ, in that the retransmission subpackets cannot be scheduled at preferable channel conditions. Also, the modulation, coding and resource format cannot be adapted at the time of retransmission according to the prevailing channel conditions at the time of retransmission.

Figure 11:
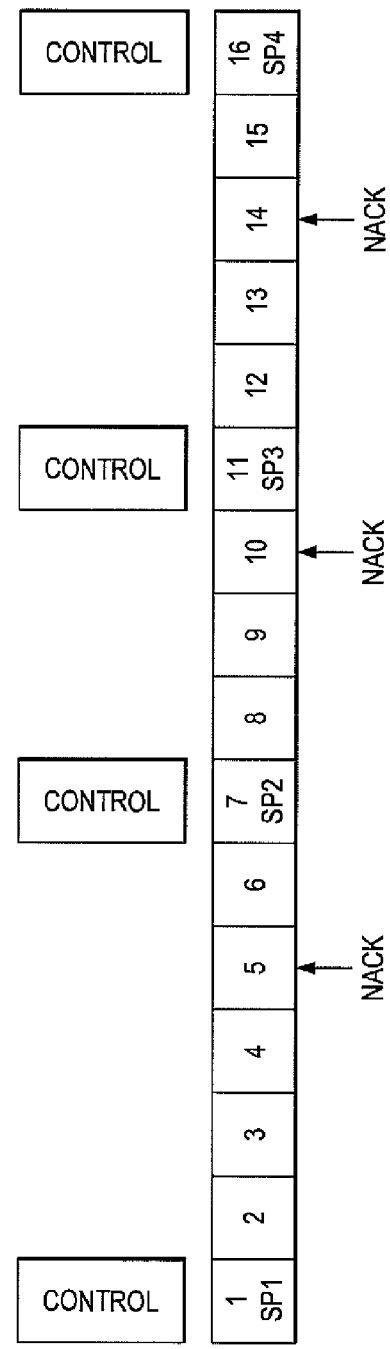
FIG. 11 shows an example of N-channel stop-and-wait asynchronous Hybrid ARQ protocol, according to one embodiment of the present disclosure.

FIG. 11 shows an example of N-channel stop-and-wait (SAW) asynchronous Hybrid ARQ (HARQ) protocol, according to one embodiment of the present disclosure. In a system using asynchronous HARQ, the retransmission timing, modulation, coding and resource format can be adapted according to the prevailing channel and resource conditions at the time of retransmission. However, one major drawback of this type of asynchronous and adaptive HARQ is that the control information needs to be sent along with each subpacket, as shown in FIG. 11. The control information transmitted with each subpacket allows for adjusting the transmission timing and also carrying the new modulation, coding and resource format information. However, the transmission of control information along with each subpacket leads to excessive overhead. It should be noted that control information in asynchronous HARQ needs to be transmitted even if the transmission timing, modulation, coding and resource information of the retransmission is unchanged. This introduces redundancy in the transmission of the control information without any significant benefit.

Figure 12:
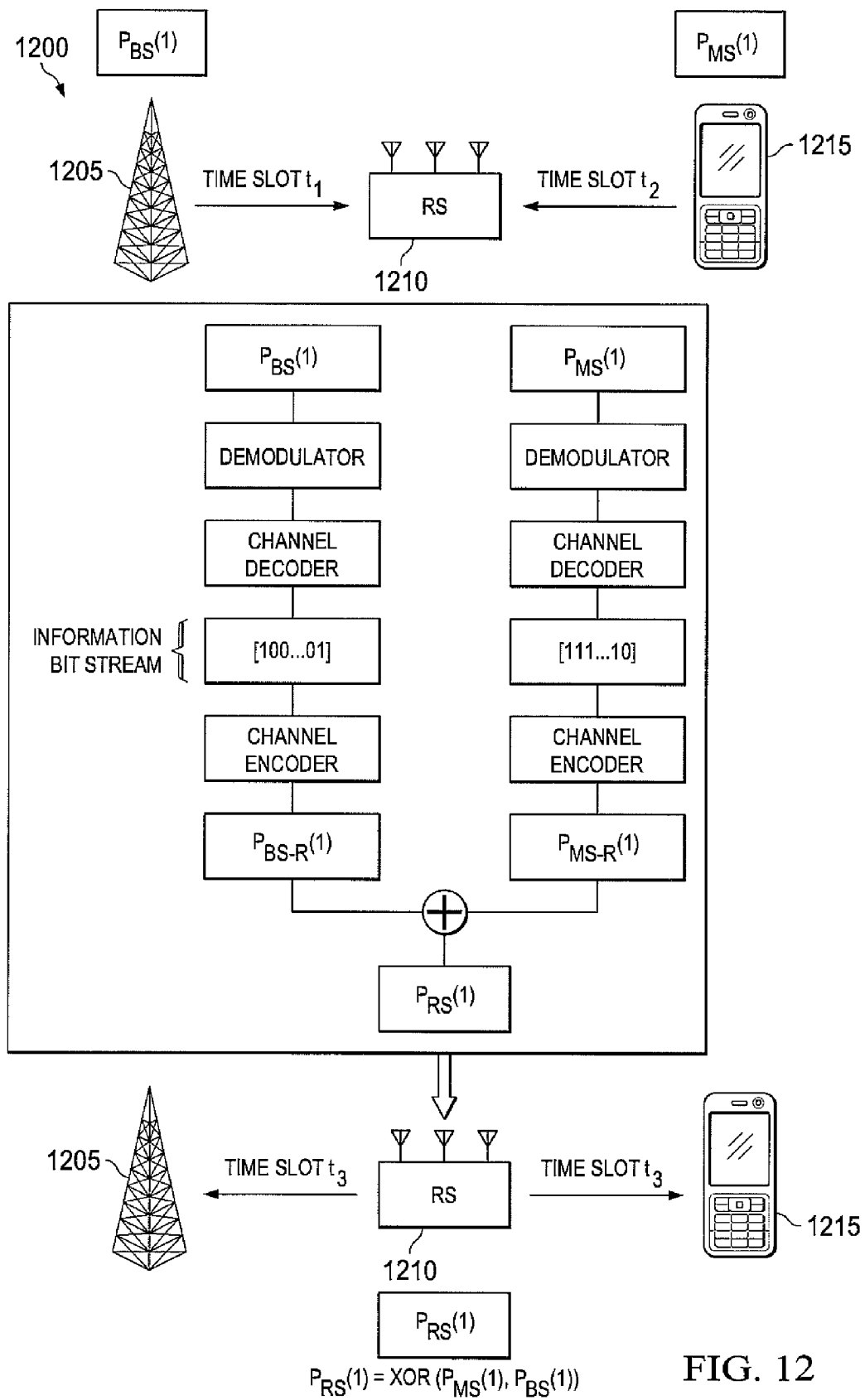
FIG. 12 illustrates a method for encoding information bit streams at a relay station, according to one embodiment of the present disclosure.

FIG. 12 illustrates a method for encoding information bit streams at a relay station, according to one embodiment of the present disclosure. Wireless network 1200 includes a base station 1205, a relay station 1210, and a mobile station 1215. In one aspect of operation, base station 1205 transmits packet $P_{BS}(1)$ to relay station 1210 during time slot $t_1$. During time slot $t_2$, mobile station 1215 transmits packet $P_{MS}(1)$ to relay station 1210. Upon receiving packets $P_{BS}(1)$ and $P_{MS}(1)$ from base station 1205 and mobile station 1215 respectively, relay station 1210 first detects, then decodes the packets to recover the information bits. Relay station 1210 then re-encodes the information bit streams from both base station 1205 and mobile station 1215 using a FEC channel encoder. Relay station 1210 then combines the coded bit streams at the bit level using an XOR operation to generate the packet $P_{RS}(1)$. This packet $P_{RS}(1)$ is transmitted in time slot $t_3$ by relay station 1210 to both base station 1205 and mobile station 1215. This procedure results in a network coded stream that is modulated and transmitted to both base station 1205 and mobile station 1215.

Once the network coded stream is received at mobile station 1215, it must be decoded. The decoding procedure used at mobile station 1215 is now described.

First, mobile station 1215 demodulates the received symbols from relay station 1210, which generates soft information equivalents of each bit in the network coded stream. The soft information equivalent of a bit is a real number whose magnitude indicates the confidence in the value, and whose sign on the number indicates if the bit is a 1 or a 0. For example, a positive soft information equivalent could indicate that the bit is a 1, while a negative soft information equivalent could indicate that the bit is a 0, depending on a pre-arranged mapping at base station 1210. Those with knowledge in the art will recognize this as the log-likelihood ratio (LLR).

Next, the soft information equivalents are multiplied element-wise by the binary phase shift key (BPSK) modulated coded bit stream of the data transmitted by mobile station 1215. The multiplication serves to undo the network coding, while maintaining the soft information magnitudes. This is similar to the XOR operation at mobile station 1215 between its own bits and the received information, as seen in conventional network coding, except that it is now adapted to the soft information to enable the decoder to perform soft decision decoding.

Finally, the modified soft information equivalents are decoded to recover the bits transmitted by base station 1205. Thus, mobile station 1215 uses its knowledge of the bits it transmitted to recover the data from the network coded packet. Base station 1205 uses the same decoding steps to decode data from the network coded packet.

Figure 13:
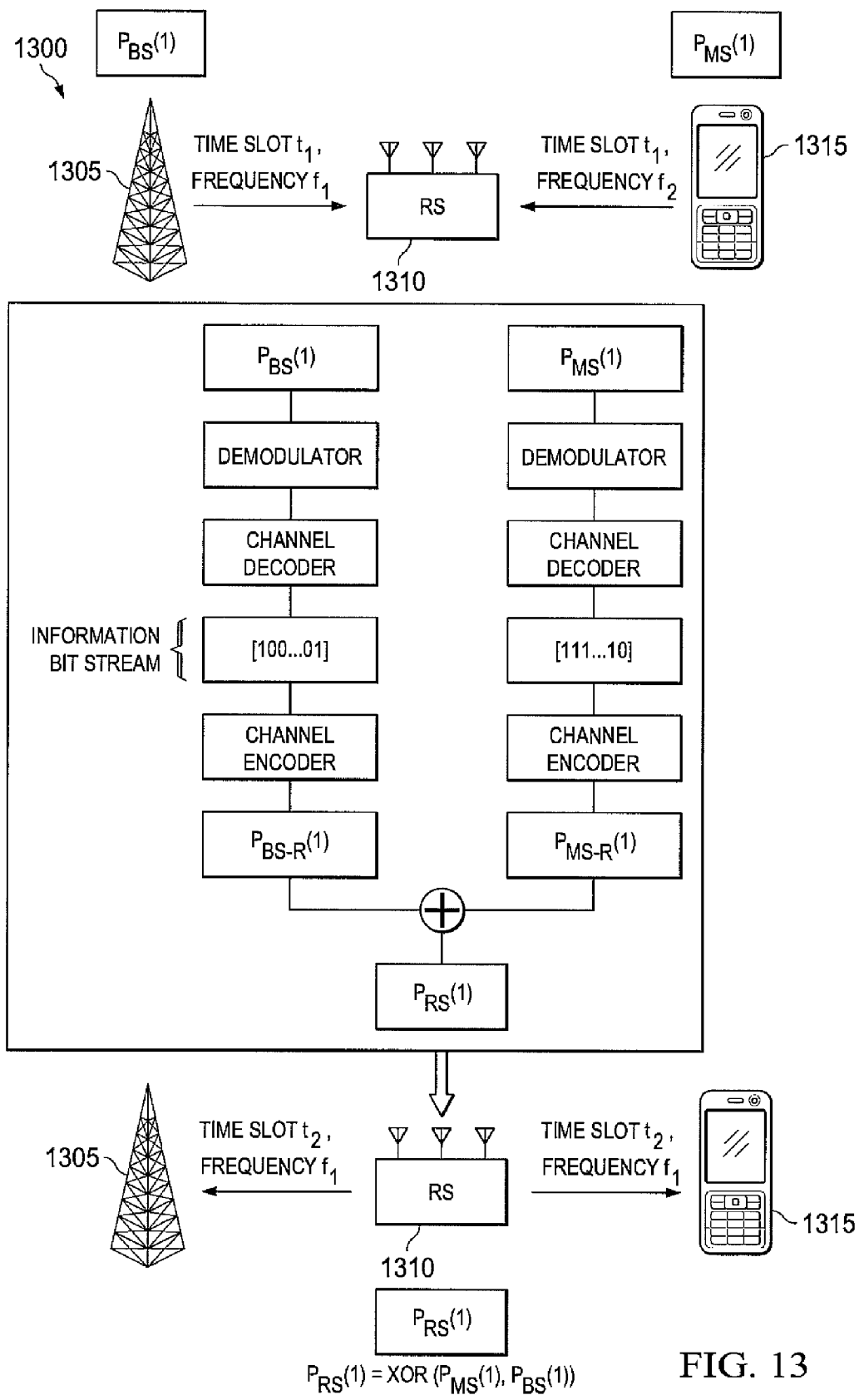
FIG. 13 illustrates a process for encoding information bit streams at a relay station in a FDD system, according to one embodiment of the present disclosure.

FIG. 13 illustrates a similar process for encoding information bit streams at a relay station, according to one embodiment of the present disclosure. In wireless network 1300, base station 1305 and mobile station 1315 transmit packets to relay station 1310 during the same time slot $t_1$, but at different frequencies $f_1$ and $f_2$. The frequencies $f_1$ and $f_2$ can refer to a set of subcarriers, as in the case of OFDM, or they can represent different bands under the same carrier frequency. With OFDM, in addition to saving an extra timeslot, relay station 1310 also saves an extra frequency resource. Since network coded packet $P_{RS}(1)$ is a single packet broadcasted to both mobile station 1315 and base station 1305, it consequently requires only one frequency resource $f_1$.

Figure 14A:
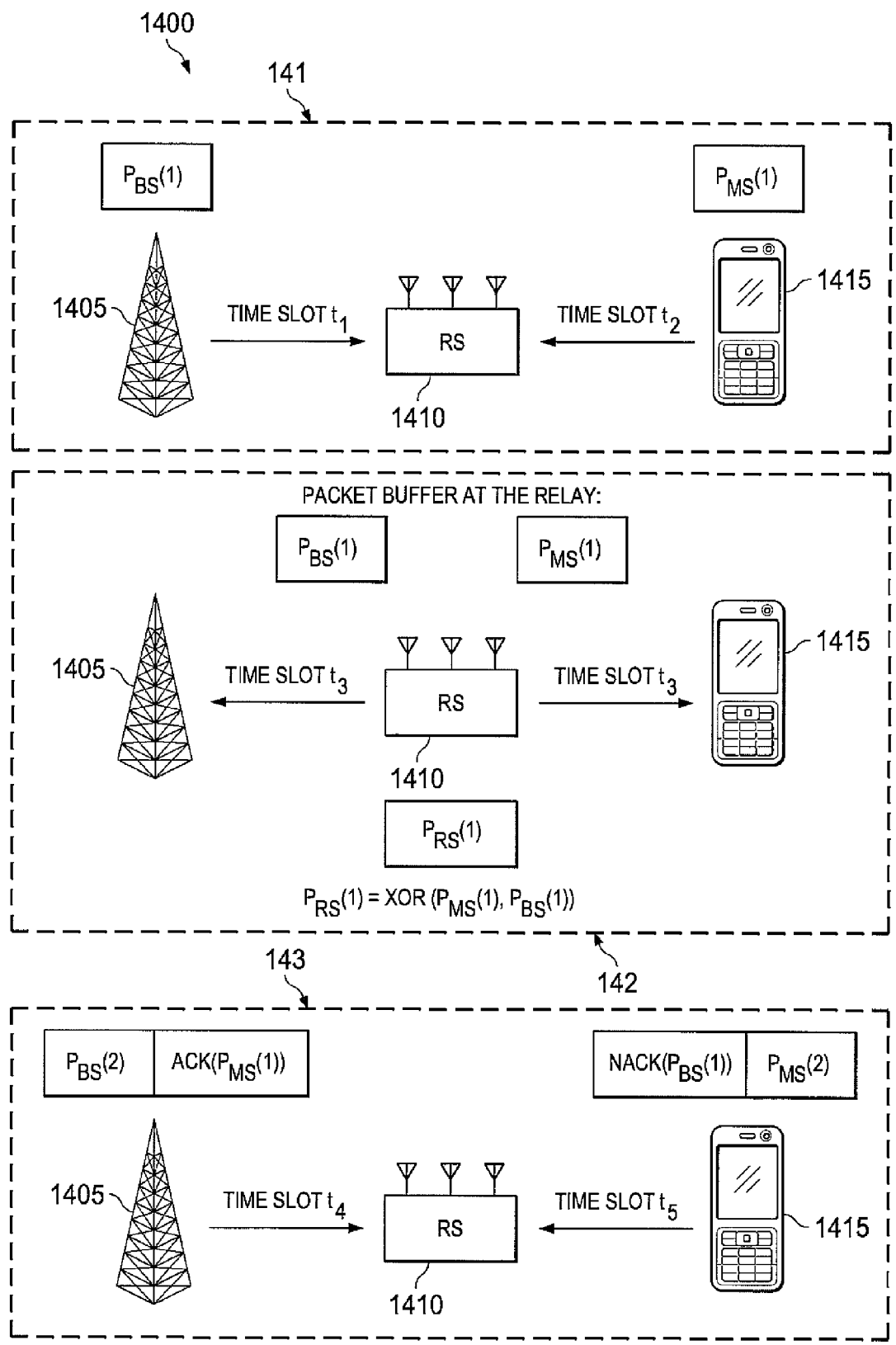
FIGS. 14A and 14B illustrate a method of HARQ transmission with network coding according to embodiments of the present disclosure.
Figure 14B:
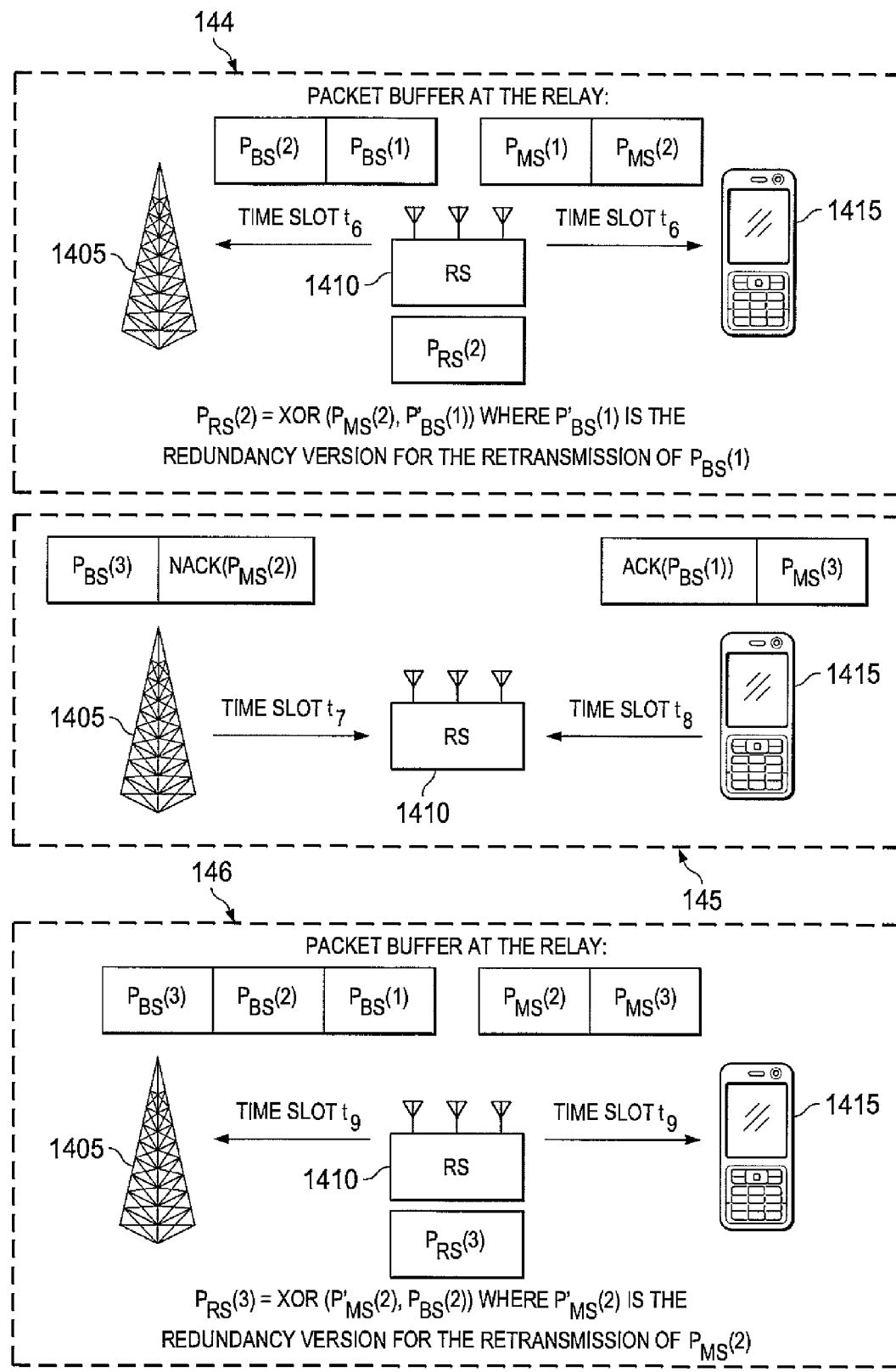

FIGS. 14A and 14B illustrate a method of HARQ transmission with network coding according to embodiments of the present disclosure. Wireless network 1400 includes a base station 1405, a relay station 1410, and a mobile station 1415. The steps that comprise the HARQ transmission is now described.

At step 141 (in FIG. 14A), during time slot $t_1$, base station 1405 transmits packet $P_{BS}(1)$ to relay station 1410. The ultimate destination of packet $P_{BS}(1)$ is mobile station 1415. At time $t_2$, mobile station 1415 transmits packet $P_{MS}(1)$, ultimately meant for base station 1405, to relay station 1410.

At step 142 (in FIG. 14A), relay station 1410 processes packets $P_{BS}(1)$ and $P_{MS}(1)$ using the network coding procedure illustrated in FIG. 12 to generate the network coded packet $P_{RS}(1)$. Relay station 1410 then broadcasts packet $P_{RS}(1)$ to both base station 1405 and mobile station 1415 in time slot $t_3$. It is assumed that relay station 1410 has received packets $P_{BS}(1)$ and $P_{MS}(1)$ from both base station 1405 and mobile station 1415 correctly without any errors. It is also assumed that relay station 1410 has sent acknowledgements to base station 1405 and mobile station 1415 that it has received packets $P_{BS}(1)$ and $P_{MS}(1)$ respectively. Also, the received packets, $P_{BS}(1)$ and $P_{MS}(1)$, from base station 1405 and mobile station 1415 respectively, will be buffered until an acknowledgement is received from their intended destinations.

At step 143 (in FIG. 14A), upon receiving the network coded packet $P_{RS}(1)$ from relay station 1410, base station 1405 and mobile station 1415 try to decode packet $P_{RS}(1)$ using the procedure outlined in FIG. 12 for decoding network coded packets. If a decoding is successful, a station would send an acknowledgement (ACK) packet. If the decoding fails, the station would send a negative acknowledgement (NACK) packet. In the illustration of FIG. 14A, base station 1405 transmits an ACK for packet $P_{MS}(1)$ along with a new packet $P_{BS}(2)$ in time slot $t_4$. It is assumed, for the purposes of this illustration, that mobile station 1415 fails to correctly decode packet $P_{BS}(1)$. Accordingly, mobile station 1415 transmits a NACK for packet $P_{BS}(1)$ along with a new packet $P_{MS}(2)$ in time slot $t_5$.

At step 144 (in FIG. 14B), upon receiving packets from both base station 1405 and mobile station 1415, relay station 1410 buffers the packets for further processing. Upon receiving the NACK for $P_{BS}(1)$ from mobile station 1415, relay station 1410 generates a redundancy version of the packet, $P'_{BS}(1)$ from the buffered packet $P_{BS}(1)$. This redundancy version packet is generated based on either chase combining or incremental redundancy HARQ techniques. Upon receiving the ACK for $P_{MS}(1)$ from base station 1405, relay station 1410 moves on to the next received packet $P_{MS}(2)$ from base station 1405, and removes $P_{MS}(1)$ from the buffer. $P'_{BS}(1)$ and $P_{MS}(2)$ are network coded to generate the new packet $P_{RS}(2)$. Relay station 1410 then transmits packet $P_{RS}(2)$ to both base station 1405 and mobile station 1415 in time slot $t_6$. Relay station 1410 must signal that the network coded packet $P_{RS}(2)$ contains a redundancy version to both base station 1405 and mobile station 1415.

Base station 1405 receives the network coded packet $P_{RS}(2)$ from relay station 1410. Base station 1405 already knows that it transmitted an ACK for the previous packet. Coupled with the signaling from relay station 1410 that a redundancy version has been transmitted, base station 1405 generates a redundancy version of the locally stored packet $P_{BS}(1)$ to undo the network coding in the packet to recover $P_{MS}(2)$. Mobile station 1415, however, follows the normal decoding procedure associated with network coding, and uses the redundancy version to decode packet $P_{BS}(1)$.

At step 145 (in FIG. 14B), base station 1405 and mobile station 1415 attempt decoding and generate either an ACK or a NACK, depending on success or failure. It is assumed, for the purposes of this illustration, that base station 1405 fails to correctly decode packet $P_{MS}(2)$. However, mobile station 1415 successfully decodes packet $P_{BS}(1)$. Consequently, base station 1405 transmits a NACK along with new packet $P_{BS}(3)$ to relay station 1410 in time slot $t_7$. Mobile station 1415 transmits an ACK along with the new packet $P_{MS}(3)$ to relay station 1410 in time slot $t_8$.

At step 146 (in FIG. 14B), relay station 1410 processes the ACK and NACK from step 145, and generates new network coded packet $P_{RS}(3)$. Packet $P_{RS}(3)$ is then transmitted to base station 1405 and mobile station 1415 in time slot $t_9$. Base station 1405 and mobile station 1415 then decode packet $P_{RS}(3)$ using one of the previously described steps. The HARQ process involving the ACK/NACK signaling can be configured to repeat for N rounds, after which it is abandoned.

The above process is repeated until all packets have been successfully exchanged between base station 1405 and mobile station 1415.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a wireless communications network, a method for encoding information bit streams at a relay station, the method comprising:
    receiving a first packet from a base station;
    receiving a second packet from a mobile station;
    decoding the first and second packets;
    re-encoding the first and second packets;
    combining the re-encoded first and second packets into a third packet using an XOR operation;
    transmitting the third packet to the base station and the mobile station;
    receiving a fourth packet and a first acknowledgement from at least one of the base station and the mobile station, the first acknowledgement indicating if the third packet was successfully decoded;
    generating a redundancy version of at least one of the first packet and second packet if the first acknowledgement is a negative acknowledgement; and
    combining the redundancy version with the fourth packet to form a fifth packet using an XOR operation.

2. The method as set forth in claim 1, wherein the first packet and the second packet are received in different time slots.

3. The method as set forth in claim 1, wherein the first packet and the second packet are received in the same time slot at different frequencies.

4. The method as set forth in claim 1, wherein the third packet is transmitted to the base station and the mobile station in the same time slot.

5. The method as set forth in claim 1, wherein the first and second packets are re-encoded using an FEC channel encoder.

6. The method as set forth in claim 1, wherein the first and second re-encoded packets comprise soft information equivalents.

7. The method as set forth in claim 1, the method further comprising the steps of:
    wherein the fourth packet and the first acknowledgement are received from the base station, the first acknowledgement indicating if the third packet was successfully decoded;
    receiving a sixth packet and a second acknowledgement from the mobile station, the second acknowledgement indicating if the third packet was successfully decoded;
    generating a redundancy version of the first packet if the first acknowledgement is a negative acknowledgement; and
    generating a redundancy version of the second packet if the second acknowledgement is a negative acknowledgement.

8. The method as set forth in claim 7, the method further comprising the steps of:
    using an XOR operation, combining into the fifth packet one of the fourth packet and the redundancy version of the first packet, and one of the sixth packet and the redundancy version of the second packet; and
    transmitting the fifth packet to the base station and the mobile station.

9. A wireless communications network comprising a plurality of relay stations, each relay station configured to:
    receive a first packet from a base station;
    receive a second packet from a mobile station;
    decode the first and second packets;
    re-encode the first and second packets;
    combine the re-encoded first and second packets into a third packet using an XOR operation;
    transmit the third packet to the base station and the mobile station;
    receive a fourth packet and a first acknowledgement from at least one of the base station and the mobile station, the first acknowledgement indicating if the third packet was successfully decoded;
    generate a redundancy version of at least one of the first packet and second packet if the first acknowledgement is a negative acknowledgement; and
    combine the redundancy version with the fourth packet to form a fifth packet using an XOR operation.

10. The wireless communications network as set forth in claim 9, wherein the first packet and the second packet are received in different time slots.

11. The wireless communications network as set forth in claim 9, wherein the first packet and the second packet are received in the same time slot at different frequencies.

12. The wireless communications network as set forth in claim 9, wherein the third packet is transmitted to the base station and the mobile station in the same time slot.

13. The wireless communications network as set forth in claim 9, wherein the first and second packets are re-encoded using an FEC channel encoder.

14. The wireless communications network as set forth in claim 9, wherein the first and second re-encoded packets comprise soft information equivalents.

15. The wireless communications network as set forth in claim 9, each relay station further configured to:
    wherein the fourth packet and the first acknowledgement are received from the base station, the first acknowledgement indicating if the third packet was successfully decoded;
    receive a sixth packet and a second acknowledgement from the mobile station, the second acknowledgement indicating if the third packet was successfully decoded;
    generate a redundancy version of the first packet if the first acknowledgement is a negative acknowledgement; and
    generate a redundancy version of the second packet if the second acknowledgement is a negative acknowledgement.

16. The wireless communications network as set forth in claim 15, each relay station further configured to:
    use an XOR operation to combine into the fifth packet one of the fourth packet and the redundancy version of the first packet, and one of the sixth packet and the redundancy version of the second packet; and
    transmit the fifth packet to the base station and the mobile station.

17. A mobile station capable of accessing a wireless communication network comprising a plurality of relay stations, the mobile station configured to:
    send a first packet to one of the plurality of relay stations;
    receive from the one relay station a second packet, the second packet comprising a coded combination of the first packet and a third packet by using an XOR operation;
    decode the second packet;

send an acknowledgement to the one relay station, the acknowledgement indicating if the second packet was successfully decoded; and receive a fourth packet from the one relay station, the fourth packet comprising a coded combination of a fifth packet and a redundancy version of at least one of the first packet and the third packet by using an XOR operation.

18. The mobile station as set forth in claim 17, the mobile station further configured to:

generate a plurality of soft information equivalents from the second packet;

multiply the plurality of soft information equivalents by a plurality of coded bits in the first packet to create a modified plurality of soft information equivalents; and decode the modified plurality of soft information equivalents.

19. The mobile station as set forth in claim 17, wherein the third packet originates at a base station.

20. The mobile station as set forth in claim 18, where each of the plurality of soft information equivalents includes a log likelihood ratio.

* * * * *